US012485598B2

(12) United States Patent
Hidaka et al.

(10) Patent No.: US 12,485,598 B2
(45) Date of Patent: Dec. 2, 2025

(54) OPERATION ABNORMALITY DETECTION METHOD, METHOD FOR MANUFACTURING RESIN CONTAINER, OPERATION ABNORMALITY DETECTION DEVICE, DEVICE FOR MANUFACTURING RESIN CONTAINER, AND DEVICE FOR MANUFACTURING RESIN PREFORM

(71) Applicant: NISSEI ASB MACHINE CO., LTD., Nagano (JP)

(72) Inventors: Yasuhiro Hidaka, Nagano (JP); Tatsuya Koshimizu, Nagano (JP); Terumasa Okada, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 346 days.

(21) Appl. No.: 18/016,380

(22) PCT Filed: Jul. 16, 2021

(86) PCT No.: PCT/JP2021/026887
§ 371 (c)(1),
(2) Date: Jan. 16, 2023

(87) PCT Pub. No.: WO2022/014714

PCT Pub. Date: Jan. 20, 2022

(65) Prior Publication Data
US 2023/0311389 A1    Oct. 5, 2023

(30) Foreign Application Priority Data
Jul. 17, 2020 (JP) ................... 2020-123154

(51) Int. Cl.
*B29C 45/76* (2006.01)
*B29C 49/06* (2006.01)
*B29C 49/78* (2006.01)

(52) U.S. Cl.
CPC ............ *B29C 45/768* (2013.01); *B29C 49/06* (2013.01); *B29C 49/78* (2013.01);
(Continued)

(58) Field of Classification Search
CPC ... B29C 49/00; B29C 49/02; B29C 2049/023; B29C 2049/024; B29C 49/06;
(Continued)

(56) References Cited

U.S. PATENT DOCUMENTS 5,531,580 A    7/1996 Bonino et al.
11,110,644 B2 *  9/2021 Gendre ............... B29C 49/4289
(Continued)

FOREIGN PATENT DOCUMENTS

DE    10 2018 107 233 A1    10/2019
EP     3 381 646 A1         10/2018
(Continued)

OTHER PUBLICATIONS

Supplementary European Search Report dated Jul. 5, 2024 in European family member application No. 21842941.3.
(Continued)

*Primary Examiner* — Fatemeh Esfandiari Nia
(74) *Attorney, Agent, or Firm* — Greenblum & Bernstein, P.L.C.

(57) ABSTRACT

An operation abnormality detection method for detecting an operation abnormality in a molding device having a movable part includes: acquiring a prescribed measured value relating to operation of the movable part and calculating, as statistical information, an average value of prescribed information values based on the prescribed measured values: calculating a first threshold and a second threshold; acquiring a current measured value and comparing a current information value based on the current measured value with the greater of the first threshold and the second threshold; and issuing a warning if the current information value at least exceeds the greater of the first threshold and the second threshold.

13 Claims, 11 Drawing Sheets

(52) U.S. Cl.
CPC ............ *B29C 2049/7876* (2022.05); *B29C 2049/7878* (2022.05); *B29C 2945/76224* (2013.01); *B29C 2945/76321* (2013.01); *B29C 2945/76391* (2013.01); *B29C 2945/76394* (2013.01); *B29C 2945/76421* (2013.01); *B29C 2945/76943* (2013.01)

(58) Field of Classification Search
CPC .... B29C 2049/7874; B29C 2049/7876; B29C 2049/7878; B29C 2049/788; B29C 2049/78805; B29C 2945/76227; B29C 2945/76; B29C 2945/76254; B29C 2945/76224; B29C 2945/76314; B29C 2945/76321; B29C 2945/76391; B29C 2945/76394; B29C 2945/76421; B29C 2945/76939; B29C 2945/76943; B29C 45/768; B29C 49/78
See application file for complete search history.

(56) References Cited

U.S. PATENT DOCUMENTS

| | | | | |
|---|---|---|---|---|
| 2002/0177921 | A1* | 11/2002 | Yoshinaga | B29C 45/76 425/149 |
| 2004/0080067 | A1* | 4/2004 | Yamazaki | B29C 45/768 264/328.1 |
| 2009/0177148 | A1* | 7/2009 | DelCastillo | A61M 5/16831 604/67 |
| 2013/0156875 | A1* | 6/2013 | Maruyama | B29C 45/84 425/150 |
| 2014/0145851 | A1 | 5/2014 | Conforti | |
| 2016/0054233 | A1* | 2/2016 | Bense | G01J 5/10 73/627 |
| 2018/0266584 | A1 | 9/2018 | Wara et al. | |
| 2019/0205805 | A1 | 7/2019 | Albino et al. | |
| 2021/0008774 | A1 | 1/2021 | Kruppa et al. | |
| 2022/0040900 | A1 | 2/2022 | Hidaka | |

FOREIGN PATENT DOCUMENTS

| | | | | |
|---|---|---|---|---|
| JP | H0752219 | A | * | 2/1995 |
| JP | 2002-079560 | A | | 3/2002 |
| JP | 3391843 | B2 | * | 3/2003 ............ B29C 49/78 |
| JP | 2017-126964 | A | | 7/2017 |
| JP | 2018-15937 | A | | 2/2018 |
| JP | 2018015937 | A | * | 2/2018 |
| JP | 2018-185799 | A | | 11/2018 |
| WO | 2020/066749 | A1 | | 4/2020 |

OTHER PUBLICATIONS

International Search Report issued in International Bureau of WIPO Patent Application No. PCT/JP2021/026887, dated Sep. 21, 2021, along with an English translation thereof.

Written Opinion issued in International Bureau of WIPO Patent Application No. PCT/JP2021/026887, dated Sep. 21, 2021, along with an English translation thereof.

* cited by examiner

OPERATION ABNORMALITY DETECTION METHOD, METHOD FOR MANUFACTURING RESIN CONTAINER, OPERATION ABNORMALITY DETECTION DEVICE, DEVICE FOR MANUFACTURING RESIN CONTAINER, AND DEVICE FOR MANUFACTURING RESIN PREFORM

TECHNICAL FIELD

The present invention relates to an operation abnormality detection method, a method for manufacturing a resin container, an operation abnormality detection device, a manufacturing apparatus of a resin container, and a manufacturing apparatus of a resin preform.

BACKGROUND ART

Patent Literature 1 discloses a blow molding machine of a resin container including at least a blow molding part, a heating unit, and a conveyance path for conveying a preform heated in the heating unit to the blow molding part. Patent Literature 2 discloses a measurement device including an acquisition unit configured to acquire a detection value of a sensor arranged in an injection molding apparatus, a threshold value generation unit configured to generate a threshold value for each time point, based on past detection values, and a determination unit configured to obtain an abnormality determination result of an injection molding situation, based on a result of comparing the threshold value acquired by the acquisition unit and the threshold value generated corresponding to an acquisition time point of the detection value.

CITATION LIST

Patent Literature

Patent Literature 1: WO2020/066749
Patent Literature 2: JP2018-015937A

SUMMARY OF INVENTION

Technical Problem

In recent years, a molding method capable of favorably manufacturing a preform or a container even when an injection molding time is shortened is suggested, so that additional high-speed molding (high cycle molding) can be implemented in an injection molding apparatus or a blow molding apparatus. Under high-speed molding, it is necessary to operate a movable part of the molding machine more stably and reliably. If the stability is low, a risk of damage to a mold or machine increases remarkably, and when it is damaged, it is inevitable to stop the machine (stop the production) for a long time. In order to determine an operation abnormality of the movable part, it is necessary to set a threshold value serving as a reference for determination on the molding machine side. However, there is a case in which the threshold value depends on a molded product (molding condition), and even for a skilled worker, setting an appropriate threshold value is difficult or requires a great effort. Another problem is that the determination of the threshold value excessively depends on an operator.

The present invention is to provide an operation abnormality detection method, a manufacturing method of a resin container, an operation abnormality detection device, a manufacturing apparatus of a resin container, and a manufacturing apparatus of a resin preform capable of easily setting an appropriate threshold value for determining an operation abnormality to reduce a workload.

Solution to Problem

An operation abnormality detection method according to one aspect of the present invention is an operation abnormality detection method of detecting an operation abnormality of a molding apparatus having a movable part. The operation abnormality detection method includes: a step of acquiring prescribed actual measured values relating to an operation of the movable part in a recent prescribed cycle number and calculating, as statistical information, an average value of prescribed information values based on the prescribed actual measured values, a step of calculating a first threshold value based on the average value and a standard deviation thereof and a second threshold value based on the average value and a value obtained by multiplying the average value by a prescribed ratio, a step of acquiring a current actual measured value relating to an operation of the movable part in a current cycle and comparing a current information value based on the current actual measured value with the greater one of the first threshold value and the second threshold value, and a step of issuing a warning when the current information value exceeds the greater one of the first threshold value and the second threshold value, in which the first threshold value is represented by a following equation (1), the first threshold value=the average value of the prescribed information values+$m \times \sigma$     (1)

(in the equation, m represents a parameter of the first threshold value set in advance, and $\sigma$ represents a standard deviation of the average value), and
the second threshold value is represented by a following equation (2), the second threshold value=the average value of the prescribed information values+the average value$\times n/100$     (2)

(in the equation, n represents a parameter (%) of the second threshold value set in advance).

A manufacturing method of a resin container according to one aspect of the present invention is a manufacturing method of a resin container including an injection molding step of injection-molding a bottomed resin preform, and a blow molding step of manufacturing a resin container by blow-molding the preform molded in the injection molding step, in which the operation abnormality detection method described above is implemented in at least one of an injection molding apparatus that is used in the injection molding step and a blow molding apparatus that is used in the blow molding step.

An operation abnormality detection device according to one aspect of the present invention is an operation abnormality detection device configured to detect an operation abnormality of a molding apparatus having a movable part. The operation abnormality detection device includes: an acquisition unit configured to acquire actual measured values detected by a sensor arranged in the molding apparatus and relating to an operation of the movable part, an average value calculation unit configured to calculate, as statistical information, an average value of prescribed information values based on a prescribed actual measured values acquired from the acquisition unit and relating to an operation of the movable part in a recent prescribed cycle number, a threshold value calculation unit configured to calculate a first threshold value based on the average value and a standard deviation thereof and a second threshold value based on the average value and a value obtained by multiplying the average value by a prescribed ratio, a comparison unit configured to compare a current information value based on a current actual measured value acquired from the acquisition unit and relating to an operation of the movable part in a current cycle with the greater one of the first threshold value and the second threshold value, and a warning unit configured to issue a warning when the current information value exceeds the greater one of the first threshold value and the second threshold value, based on an output from the first comparison unit, in which the first threshold value is represented by a following equation (1), the first threshold value=the average value of the prescribed information values+$m \times \sigma$    (1)

(in the equation, m represents a parameter of the first threshold value set in advance, and σ represents a standard deviation of the average value), and
the second threshold value is represented by a following equation (2), the second threshold value=the average value of the prescribed information values+the average value$\times n/100$    (2)

(in the equation, n represents a parameter (%) of the second threshold value set in advance).

A manufacturing apparatus of a resin container according to one aspect of the present invention is a manufacturing apparatus of a resin container including an injection molding part configured to injection-mold a bottomed resin preform, a blow molding part configured to manufacture a resin container by blow-molding the preform molded in the injection molding part, and the operation abnormality detection device described above, in which the operation abnormality detection device is configured to detect an operation abnormality of the movable part in at least one of the injection molding part and the blow molding part.

A manufacturing apparatus of a resin container according to one aspect of the present invention is a manufacturing apparatus of a resin container including a blow molding part configured to manufacture a resin container by blow-molding a preform, and the operation abnormality detection device described above.

A manufacturing apparatus of a resin preform according to one aspect of the present invention is a manufacturing apparatus of a resin preform including an injection molding part configured to injection-mold a bottomed resin preform, and the operation abnormality detection device described above.

Advantageous Effects of Invention

According to the present invention, it is possible to provide the operation abnormality detection method, the manufacturing method of a resin container, the operation abnormality detection device, the manufacturing apparatus of a resin container, and the manufacturing apparatus of a resin preform capable of easily setting an appropriate threshold value for determining an operation abnormality to reduce a workload.

DESCRIPTION OF EMBODIMENTS

Figure 1:
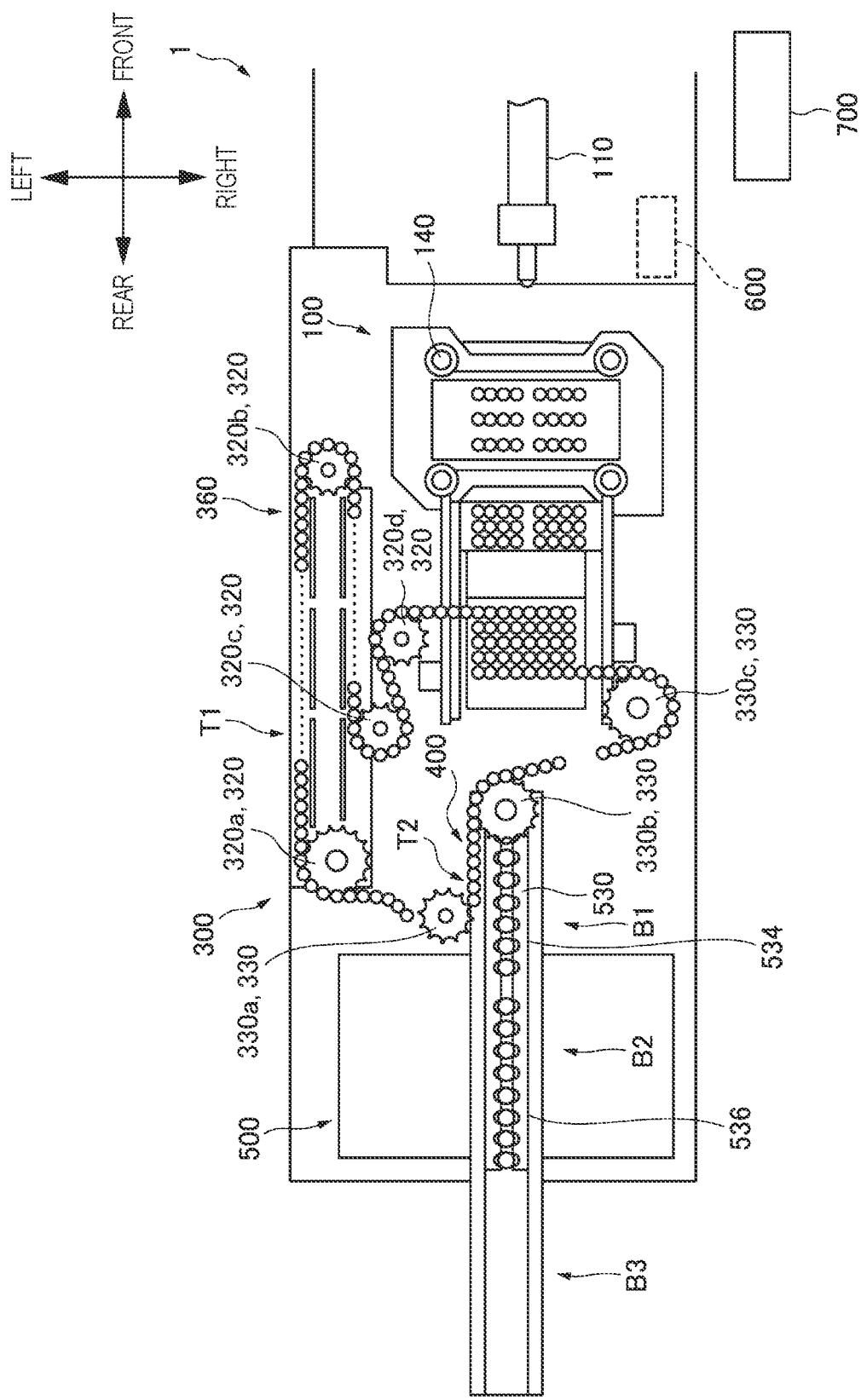
FIG. 1 is a schematic plan view of a blow molding apparatus.

Hereinafter, an embodiment of the present invention will be described with reference to the drawings. Note that, for convenience of description, the dimension of each member shown in the drawings may be different from the dimension of each actual member.

In addition, in the description of the present embodiment, for convenience of description, "left and right direction", "front and rear direction", and "upper and lower direction" are appropriately referred to. These directions are relative directions set with respect to the blow molding apparatus shown in FIGS. 1 and 2. Here, "upper and lower direction" is a direction including "upper direction" and "lower direction". "Front and rear direction" is a direction including "front direction" and "rear direction". The "left and right direction" is a direction including "left direction" and "right direction".

Figure 2:
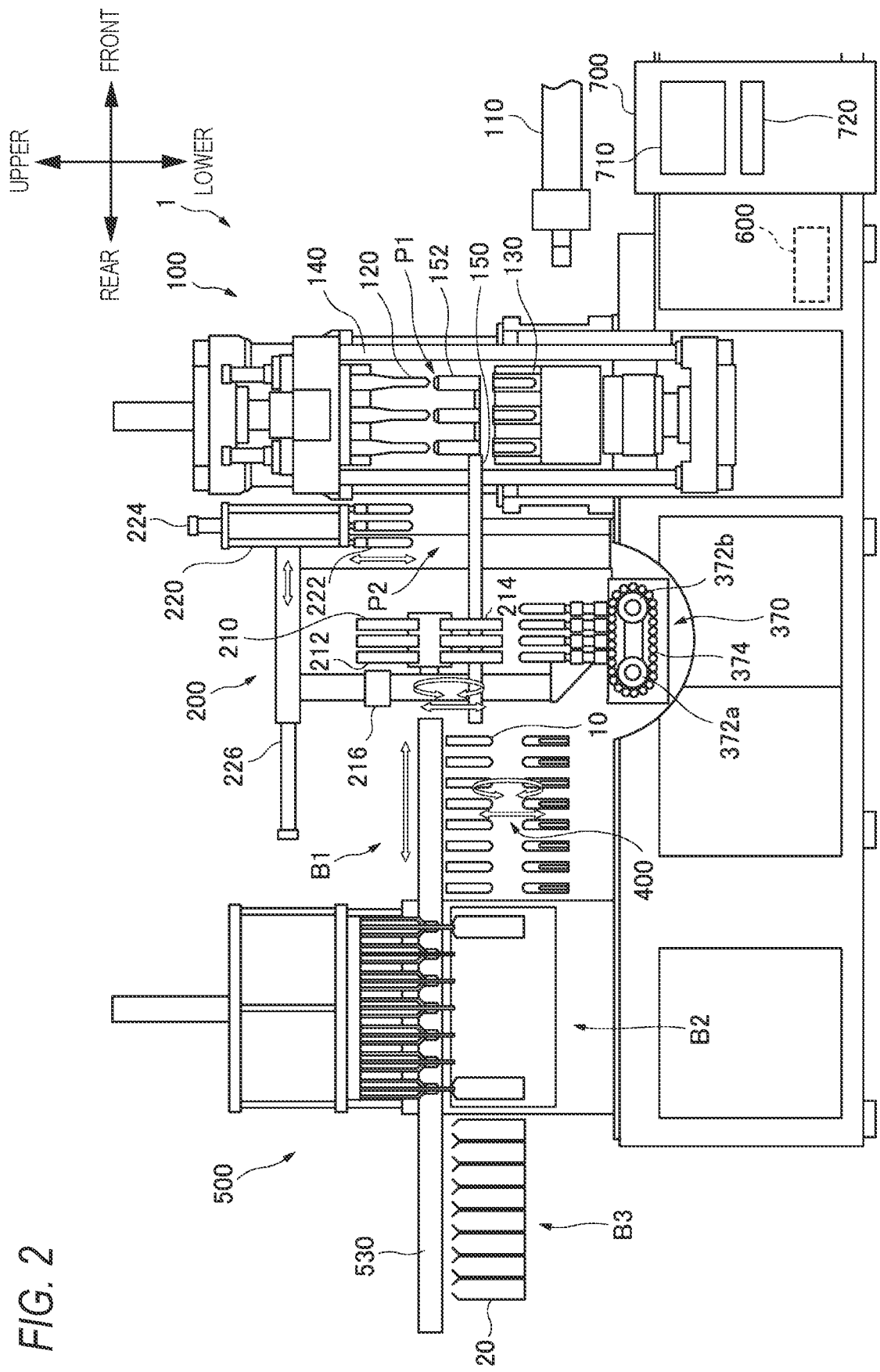
FIG. 2 is a schematic side view of the blow molding apparatus.

FIG. 1 is a schematic plan view showing an overall aspect of a blow molding apparatus 1 of a resin container (an example of a manufacturing apparatus of a resin container) according to an embodiment. FIG. 2 is a schematic side view showing the overall aspect of the blow molding apparatus 1 according to the embodiment. The blow molding apparatus 1 includes an injection molding part 100 configured to mold a resin preform 10, a blow molding part 500 configured to mold a container 20 by blow-molding the preform 10, and a conveyance part 300 configured to convey the preform 10 molded in the injection molding part 100 to the blow molding part 500 (FIG. 1). The blow molding apparatus 1 is a hot parison-type (1.5 stage-type) blow molding apparatus in which N preforms 10 simultaneously injection-molded are blow-molded by M in n times.

The blow molding apparatus 1 includes a take-out device 150 configured to take out the preform 10 from the injection molding part 100, a preform transfer device 220 configured to transfer the preform 10 from the take-out device 150, and a first reversing part (post-cooling part) 200 configured to deliver the preform 10 from the preform transfer device 220 to the conveyance part 300 (FIG. 2). In addition, the blow molding apparatus 1 includes a second reversing part 400 configured to deliver the preform 10 from the conveyance part 300 to the blow molding part 500 (FIG. 2). Further, the blow molding apparatus 1 includes an operation abnormality detection device 600 and an input/output device 700 (FIGS. 1 and 2).

The injection molding part 100 is configured to injection-mold N preforms 10 simultaneously by M (M=N/n: M is a natural number) in each of n rows (n is an integer of two or greater) parallel to the left and right direction. The injection molding part 100 includes an injection device 110 configured to inject resin, an injection core mold 120, an injection neck mold (not shown), an injection cavity mold 130, and a mold clamping mechanism configured to drive clamping of molds along four tie bars 140. As shown in FIG. 1, the maximum number N of the preforms that are simultaneously injection-molded in the injection molding part 100 may be, for example, 24 (3 rows×8 preforms). When a diameter of the preform is large, 4 preforms may be arrayed in each row, and therefore, the total number N is 12 in 3 rows.

The take-out device 150 is configured to take out the N preforms 10 molded in the injection molding part 100. The take-out device 150 is configured to be able to horizontally move N (for example, 3 rows×8) holding members 152 (for example, pots) at a receiving position P1 below the injection core mold 120 and at a delivery position P2 outside a space surrounded by the tie bars 140.

The preform transfer device 220 is configured to transfer the N preforms 10 held in the holding members 152 in three rows of the take-out device 150 located at the delivery position P2 shown in FIG. 2 to the first reversing part 200. The preform transfer device 220 includes a preform holder 222, a first transfer mechanism 224 configured to move the preform holder 222 up and down in the upper and lower direction, and a second transfer mechanism 224 configured to horizontally move the preform holder 222 and the first transfer mechanism 224 in the front and rear direction. As a drive source for the first and second transfer mechanisms 224 and 226, an air cylinder or a servomotor is used, for example.

The first reversing part 200 is a part for post-cooling (additionally cooling) the preform 10, and is configured to reverse the preform 10 in an upright state molded in the injection molding part 100 to an inverted state with a neck portion facing downward, and to deliver the same to the conveyance part 300. The first reversing part 200 includes a first reversing member 210. The first reversing member 210 has N first reversing pots 212 and N second reversing pots 214 provided to face the first reversing pots 212. The first reversing pot 212 and the second reversing pot 214 (first reversing member 210) are configured to be intermittently reversible by 180° around an axis. The first reversing member 210 is configured to be able to move up and down by a ball screw or the like that is driven by a drive source 216 (for example, a servomotor).

Figure 3:
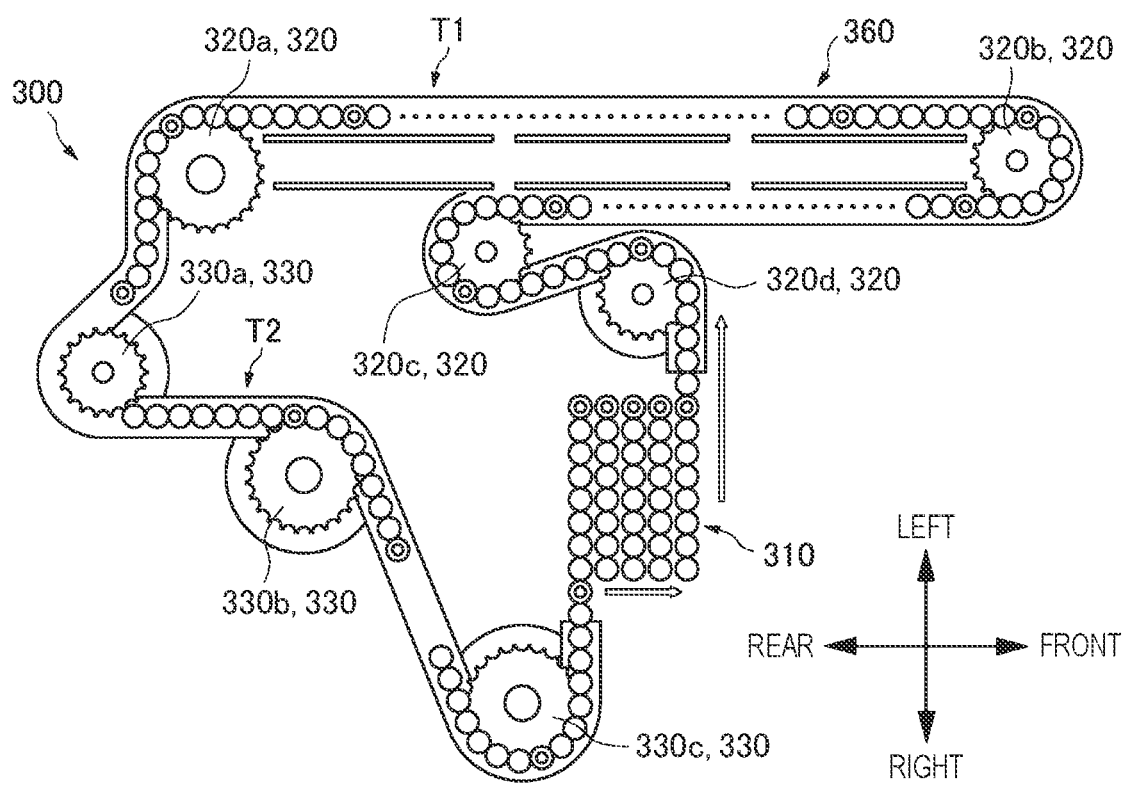
FIG. 3 is a plan view of a conveyance part.

The conveyance part 300 is configured to convey, to the blow molding part 500, the preform 10 conveyed from the injection molding part 100 to the conveyance part 300 via the first reversing part 200. FIG. 3 is a plan view showing an aspect of the conveyance part 300. The conveyance part 300 includes a plurality of first conveyance members 310 configured to support the preforms 10. The M first conveyance members 310 are connected by a connecting member to form one set of the first conveyance members 310. The connecting member of one set of the first conveyance members 310 is configured to be driven by a first conveyance driving unit 320 and a second conveyance driving unit 330, which will be described later. In FIG. 3, a position of the leading first conveyance member 310 (or the preform 10) of one set of the first conveyance members 310 is marked with a double circle so as to distinguish the same with the other seven ones other than the leading one. Each of the first conveyance members 310 is configured to be rotatable around an axis. Note that, an aspect in which the first conveyance members 310 are not connected is also possible. In this case, each of the first conveyance members 310 is provided with a member that engages with a continuous/intermittent drive member such as a sprocket.

The conveyance part 300 has a loop-shaped conveyance path composed of a guide rail or the like, and is configured to convey the first conveyance members 310 in a circulation manner along the conveyance path. The conveyance part 300 includes a plurality of sprockets 320a, 320b, 320c and 320d serving as a first conveyance driving unit 320 configured to continuously drive the first conveyance members 310, and sprockets 330a, 330b and 330c serving as a second conveyance driving unit 330 configured to intermittently drive the first conveyance members 310. In the first conveyance driving unit 320, the sprocket 320d, the sprocket 320c, the sprocket 320b, and the sprocket 320a are arranged in corresponding order from an upstream side. In the second conveyance driving unit 330, the sprocket 330a, the sprocket 330b, and the sprocket 330c are arranged in corresponding order from the upstream side.

A region in which the first conveyance members 310 are continuously driven by the first conveyance driving unit 320 is a continuous conveyance region T1, and a region in which the first conveyance members 310 are intermittently driven by the second conveyance driving unit 330 is an intermittent conveyance region T2. The continuous conveyance region T1 is located on a further upstream side of the conveyance part 300 than the intermittent conveyance region T2. A heating unit 360 configured to heat a temperature of the preform 10 to a temperature suitable for blow molding is provided in the continuous conveyance region T1. The heating unit 360 is arranged on a path spanning the sprocket 320c, the sprocket 320b, and the sprocket 320a in the continuous conveyance region T1. The heating unit 360 may be configured by arranging heaters, for example, quartz heaters and reflectors arranged at intervals in a conveyance direction and in multiple stages in a height direction (upper and lower direction), on both sides of the conveyance part 300 in the continuous conveyance region T1. Inside the heating unit 360, a blower may be configured to blow wind from a back side of the heater.

In addition, the conveyance part 300 includes a parallel driving device 370 arranged at a position below the first reversing part 200 and configured to drive one set of (n+1) or more (for example, four (four rows)) first conveyance members 310 in parallel (FIG. 2). The parallel driving device 370 is configured by attaching both ends of a plurality of conveying rails to two chains 374 spanning two sprockets 372a and 372b at end portions in the front and rear direction. When one of the sprockets 372a and 372b is rotated by one step, the conveyance rails are transferred by one step. The leading row of one set of the first conveyance members 310 arranged in the parallel driving device 370 is configured to be pushed out leftward by a carry-out device (not shown) including, for example, an air cylinder or the like. Thereby, one set of the first conveyance members 310 on which the preforms 10 are placed are continuously conveyed by being sequentially engaged with the sprocket 320d that is continuously driven. The parallel driving device 370 is configured to transfer another set of first conveyance members 310 forward by one step after conveying one set of the first conveyance members 310 leftward. The rearmost row of the parallel driving device 370 is configured to receive one set of the first conveyance members 310 on which the preforms 10 delivered from the sprocket 330*c* are not placed.

The leading first conveyance member 310 of the leading row of one set of the first conveyance members 310 is carried out by the carry-out device and engaged with the most upstream sprocket 320*d*, so that a continuous conveyance force is applied from the sprocket 320*d* to one set of the first conveyance members 310. When a drive force is applied to each set of first conveyance members 310 that engage with the four continuously driven sprockets 320*a*, 320*b*, 320*c* and 320*d* existing in the continuous conveyance region T1, another set of the first conveyance members 310 that do not engage with the continuously driven sprocket on the upstream side thereof are pushed, and therefore, the plurality of sets of first conveyance members 310 are continuously conveyed along the conveyance direction in the continuous conveyance region T1.

The second reversing part 400 is arranged between the sprocket 330*a* and the sprocket 330*b* in the intermittent conveyance region T2 of the conveyance part 300 (FIGS. 1 and 2). The second reversing part 400 includes a second reversing member (not shown) configured to reverse the preform 10 conveyed to the position of the second reversing part 400 by the conveyance part 300 from an inverted state to an upright state. One set of the first conveyance members 310 are intermittently driven by the second conveyance driving unit 330 so that one set of the first conveyance members 310 are stopped for a prescribed time at the position of the second reversing part 400.

The blow molding part 500 is configured to mold the resin containers 20 by stretching M preforms 10 with blowing air. The blow molding part 500 includes a blow cavity mold that is a split mold, is openable and closable in the left and right direction and defines a shape of a body portion of the container 20, a liftable bottom mold that defines a bottom portion of the container 20, a second conveyance member 530 for conveying the preform 10 in the front and rear direction, and a third conveyance member for conveying the container 20 in the front and rear direction. In addition to these, the blow molding part 500 may include a stretch rod, a blow core mold, a neck mold, and the like. In the case of having a stretch rod, the resin container 20 is molded by biaxially stretching the preform by using a blowing air and a vertical-axis driving of the stretch rod.

The second conveyance member 530 is a chuck member configured to grip neck portions of M preforms 20 and to convey the same intermittently. The second conveyance member 530 includes holding arms configured to grip the neck portions of the preforms 10. The second conveyance member 530 is configured to reciprocally drive in the front and rear direction, in a region of a carry-in unit 534. The reciprocating drive is realized by, for example, a servomotor. The reciprocating drive reciprocates the second conveyance member 530 between the preform receiving position B1 and the blow molding position B2, in the carry-in unit 534. In addition, in a region of a carry-out unit 536, the third conveyance member (not shown) is configured to reciprocally move between the blow molding position B2 and a take-out position B3 so as to convey the container 20 outside the machine. The holding arms are configured to be integrally driven to be opened and closed in the left and right direction by a drive force of an air cylinder, for example. In addition, a row pitch (distance between the respective preforms) of the respective holding arms of the second conveyance member 530 of the carry-in unit 534 is configured to be changeable from a narrow pitch at the preform receiving position B1 to a wide pitch at the blow molding position B2 when moving from the preform receiving position B1 to the blow molding position B2.

Figure 4:
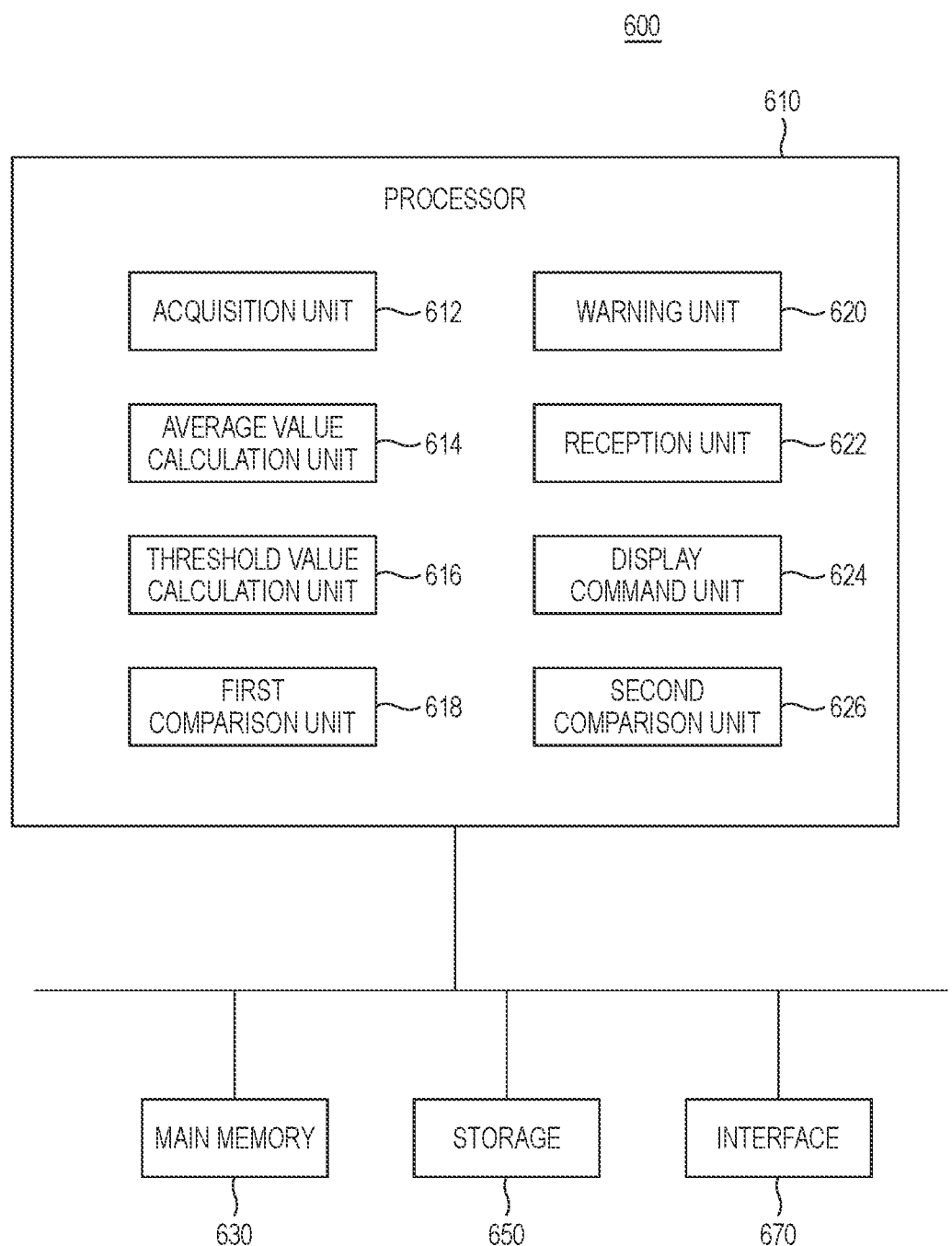
FIG. 4 is a block diagram of an operation abnormality detection device.

The operation abnormality detection device 600 is a device configured to detect an operation abnormality of the movable part of the blow molding apparatus 1. The operation abnormality is likely to occur in the movable part of the injection molding part 100 or the blow molding part 500, and may include, for example, a delay in mold opening operation (mold-release operation of the injection mold) of the injection core mold 120 and the injection cavity mold 130 due to shortage of grease to the tie bar 140, a delay in preform transfer operation (mold-release operation of a preform, a falling speed of a preform) from the neck mold to the take-out device 150 accompanied by contamination (increase in amount of attached resin) on the neck mold, a delay in conveyance operation accompanied by component wear damage or the like of the second conveyance member 530 with a high operating rate, and the like. FIG. 4 is a block diagram showing a configuration of the operation abnormality detection device 600 according to the present embodiment. The operation abnormality detection device 600 includes a processor 610, a main memory 630, a storage 650, and an interface 670. A program for detecting an operation abnormality of the blow molding apparatus 1 is stored in the storage 650. Examples of the storage 650 include a hard disk drive (HDD), a solid state drive (SSD), anon-volatile memory, and the like. The processor 610 is configured to read a program from the storage 650, to develop the same into the main memory 630, and to execute processing in accordance with the program. In addition, the processor 610 is configured to secure a storage area in the main memory 630 or the storage 650 in according with the program. The processor 610 is configured to function as an acquisition unit 612, an average value calculation unit 614, a threshold value calculation unit 616, a first comparison unit 618, a warning unit 620, a reception unit 622, a display command unit 624, and a second comparison unit 626 by executing the program.

The acquisition unit 612 is configured to acquire actual measured values detected by a sensor arranged in the blow molding apparatus 1 and relating to an operation of the movable part. In the present embodiment, the movable part includes, for example, the injection core mold 120 (injection mold opening/closing unit) of the injection molding part 100, the injection neck mold (preform mold-release unit) of the injection molding part 100, and the second conveyance member 530 of the blow molding part 500. An actual measured value relating to an operation of the injection core mold 120 may be a pump pressure of a hydraulic pump (hydraulic pump configured to drive the mold clamping mechanism of the injection molding part 100) configured to execute an opening/closing operation of a mold for injection molding. An actual measured value relating to an operation of the injection neck mold of the injection molding part 100 may be a period of time until the preform 10 released from the injection neck mold is accommodated in the holding member 152 of the take-out device 150. Mold opening strokes of the injection neck mold may be set at regular intervals, and a timing at which the injection neck mold, which is a split mold, is mold-opened may be used as a start of measurement of the actual measured values. An actual measured value relating to an operation of the second conveyance member 530 of the blow molding part 500 may be a movement value of the second conveyance member 530. In view of the pitch change, a movement value of a front end (front) and a movement value of a rear end (rear) of the second conveyance member 530 may be measured. The actual measured values acquired by the acquisition unit 612 are stored in the storage 650.

The average value calculation unit 614 is configured to calculate, as statistical information, an average value of prescribed information values based on prescribed actual measured values acquired from the acquisition unit 612 and relating to an operation of the movable part in a recent prescribed cycle number. Specifically, the average value calculation unit 614 is configured to be able to execute at least one of following two processing (1) and (2). (1) The average value calculation unit calculates, as statistical information, an average value obtained by averaging prescribed actual measured values acquired from the acquisition unit 612 and relating to the operation of the movable part of the blow molding apparatus 1 in the recent prescribed cycle number. (2) The average value calculation unit calculates difference values between the actual measured values acquired from the acquisition unit 612 and a first setting value for the operation of the movable part of blow molding apparatus 1 measured as the actual measured values, and calculates, as statistical information, an average value obtained by averaging prescribed difference values relating to the operation of the movable part of the blow molding apparatus 1 in the recent prescribed cycle number. The prescribed actual measured values and the prescribed difference values are examples of the prescribed information values based on the prescribed actual measured values.

In the present embodiment, the first setting value relating to the operation of the second conveyance member 530 may be set as a command value for a servomotor. The first setting value may be set at both the front end (front) and the rear end (rear) of the second conveyance member 530. The movement value of the front end (front) and the movement value of the rear end (rear) of the second conveyance member 530 may be compared with the respective first setting values to calculate respective difference values. The prescribed cycle number may be, for example, at least 20 cycles from standpoints of statistical processing and speeding up execution of the operation abnormality detection method. The prescribed actual measured values refers to a plurality of actual measured values acquired by the acquisition unit 612 during the prescribed cycle number. The prescribed difference values refers to a plurality of difference values calculated by comparing a plurality of actual measured values acquired by the acquisition unit 612 for the prescribed cycle number with the first setting value. The difference values and average value calculated by the average value calculation unit 614 and the standard deviation thereof are stored in the storage 650.

The threshold value calculation unit 616 is configured to calculate a first threshold value based on an average value calculated from the prescribed information values (prescribed actual measured values or prescribed difference values) and a standard deviation thereof, and a second threshold value based on the average value and a value obtained by multiplying the average value by a prescribed ratio. The first threshold value is represented by a following equation (1), and the second threshold value is represented by a following equation (2).

$$\text{the first threshold value} = \text{the average value of the prescribed information values} + m \times \sigma \quad (1)$$

(in the equation, m represents a parameter of the first threshold value set in advance, and σ represents a standard deviation of the average value)

$$\text{the second threshold value} = \text{the average value of the prescribed information values} + \text{the average value} \times n/100 \quad (2)$$

(in the equation, n represents a parameter (%) of the second threshold value set in advance).

"m" in the equation (1) is a parameter that can be arbitrarily set to the blow molding apparatus 1 (operation abnormality detection apparatus 600) in advance, in response to the operation of the movable part. In an operation abnormality detection method of the present embodiment, which will be described later, m is set to a value of 6.0 or less (for example, 4.5 or 6.0).n in the equation (2) is a parameter that can be arbitrarily set to the blow molding apparatus 1 (operation abnormality detection apparatus 600) in advance so as not to determine an operation of the blow molding apparatus 1 as being abnormal by a small actual measured value fluctuation even when a fluctuation width of the actual measured values at the time of calculating an average value is small and the first threshold value is set low. In the operation abnormality detection method of the present embodiment, which will be described later, n is set to a value of 15(%) or less (for example, 10(%)). The first threshold value and the second threshold value may be stored in the storage 650.

In addition, the threshold value calculation unit 616 may be configured to be able to calculate a third threshold value obtained by multiplying the second setting value relating to the operation of the movable part by a prescribed ratio. In the present embodiment, the second setting value relating to the operation of the second conveyance member 530 may be set as an instantaneous maximum torque value of the servomotor. In this example, the second setting value may be set at both the front end (front) and the rear end (rear) of the second conveyance member 530. Further, in the present embodiment, the second setting value relating to the opening/closing operation of the mold for injection molding may be set as an acceptable upper limit value of the pump pressure of the hydraulic pump. The third threshold value is a threshold value corresponding to an information value (the actual measured value itself or a difference value calculated by comparing the actual measured value and a prescribed setting value) based on the actual measured value of the movable part that is not measured in a normal state, and can be set to 'the second setting value×a prescribed ratio (for example, 95%)'. The third threshold value may be stored in the storage 650.

The first comparison unit 618 is configured to compare a current information value based on a current actual measured value acquired from the acquisition unit 612 and relating to the operation of the movable part in a current cycle with the greater one of the first threshold value and the second threshold value. Specifically, the first comparison unit 618 is configured to be able to execute at least one of following two processing (1) and (2). (1) The first comparison unit compares a current actual measured value acquired from the acquisition unit 612 and relating to an operation of the movable part in a current cycle with the greater one of the first threshold value and the second threshold value. (2) The first comparison unit compares a current difference value from the first setting value for the operation of the movable part calculated based on the current actual measured value acquired from the acquisition unit 612 with the greater one of the first threshold value and the second threshold value. The current difference value may be calculated by the average value calculation unit 614 or may be calculated by a functional unit additionally provided. The current actual measured value and the current difference value are examples of the current information value based on the current actual measured value.

The second comparison unit 626 is configured to compare the current information value with the third threshold value. Specifically, the second comparison unit 626 is configured to compare at least one of the current actual measured value and the current difference value with the third threshold value.

The warning unit 620 is configured to issue a warning when the current information value exceeds the greater one of the first threshold value and the second threshold value, based on an output from the first comparison unit 618. However, the warning unit 620 may also be configured to issue a warning when the current information value exceeds the third threshold value based on the output from the second comparison unit 626.

The reception unit 622 is configured to receive an input of the parameter m of the first threshold value from an input unit 720, which will be described later. In addition, the reception unit 622 may be configured to receive an input of the parameter n of the second threshold value from the input unit 720, which will be described later. Further, when the threshold value calculation unit 616 calculates the third threshold value, the reception unit 622 may be configured to receive the second setting value and the prescribed ratio relating to the operation of the movable part for calculating the third threshold value. Further, the reception unit 622 may be configured to receive an input of the third threshold value itself. In addition, the reception unit 622 is not limited to receiving an input from a worker or the like, and may be configured to receive the parameter m, the parameter n, the first setting value, the second setting value, the prescribed ratio, or the third setting value by calling a fixed value described in advance in a program.

The display command unit 624 is configured to cause a display unit 710, which will be described later, to display the greater one of the first threshold value and the second threshold value, the current information value in the current cycle, and the average value. Note that, when the second comparison unit 626 outputs that the current information value exceeds the third threshold value, the display command unit 624 may cause the display unit 710 to display the third threshold value.

The input/output device 700 includes a display unit 710 and an input unit 720 (FIG. 2). The input unit 720 includes an input device such as a button, a keyboard, and the like for inputting a control instruction to the blow molding apparatus 1. The display unit 710 includes a display device such as a display for outputting operation information about the blow molding apparatus 1.

Figure 5:
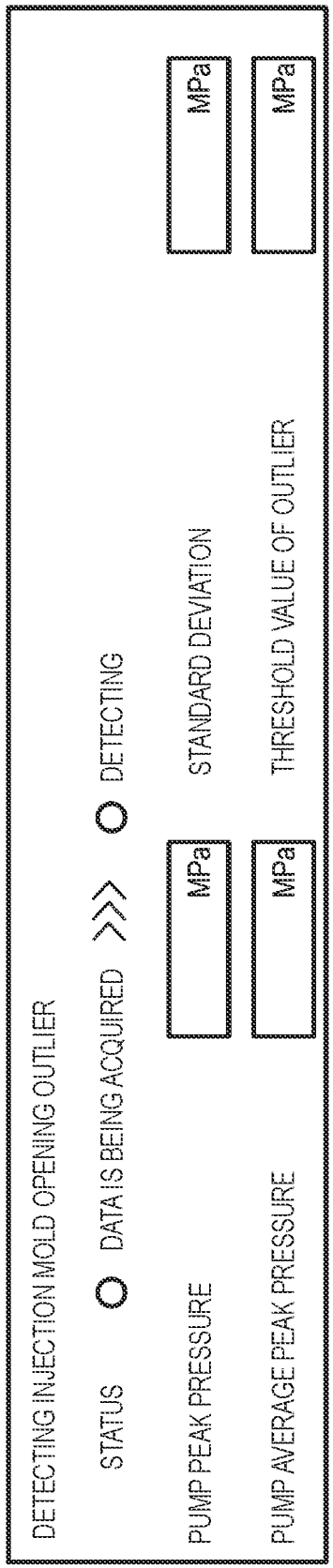
FIG. 5 shows an example of an aspect in which a display unit displays elements of an operating state of a core mold for injection molding.

FIG. 5 shows an example of an aspect in which the display unit 710 displays elements of an operating state of the injection core mold 120 of the blow molding apparatus 1, and is an example of a screen for monitoring/detecting an abnormality in an injection mold opening operation of the injection molding part 100 using the above-described operation abnormality detection device 600 or operation abnormality detection method. FIG. 5 shows an aspect in which a maximum pump pressure value (an example of the actual measured values) of the hydraulic pump is displayed as "pump peak pressure", an average value of the maximum pump pressure value of the hydraulic pump in a prescribed cycle (for example, 20 cycles) is displayed as "pump average peak pressure", a standard deviation of the average value is displayed as "standard deviation", and the greater one of the first threshold value and the second threshold value or the third threshold value is displayed as "threshold value of outlier", in an operation in which the injection core mold 120 is raised (a mold opening operation with respect to the injection cavity mold 130). On the screen shown in FIG. 5, until the average value in the prescribed cycle is calculated, a lamp "Data is being acquired" of "Status" is turned on, and when the measurement of the current actual measured value starts after the calculation of the average value is completed, a lamp "Detecting" is turned on.

Figure 6:
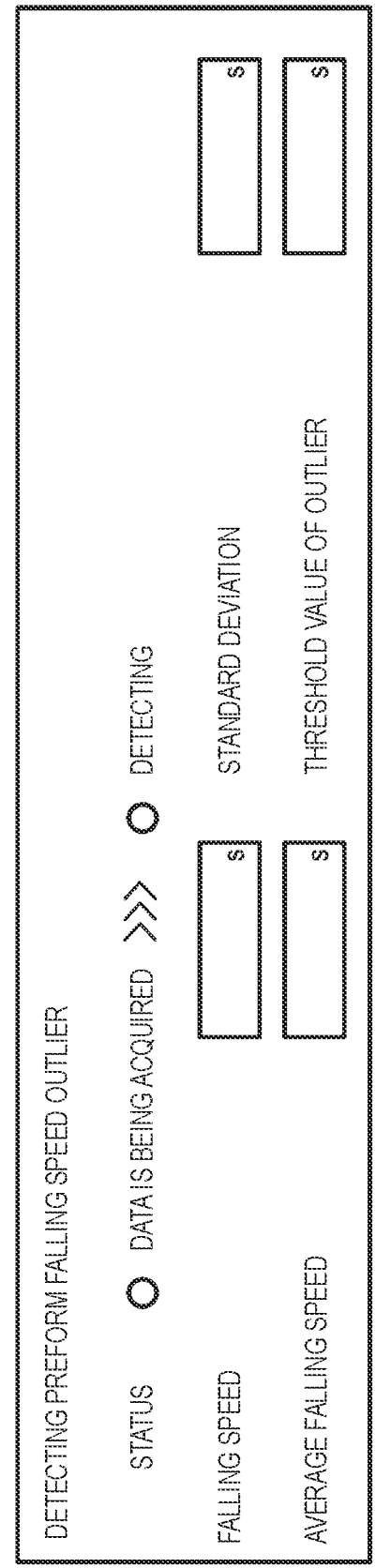
FIG. 6 shows an example of an aspect in which the display unit displays elements of an operating state of an injection neck mold.

FIG. 6 shows an example of an aspect in which the display unit 710 displays elements of an operating state of the injection neck mold of the blow molding apparatus 1, and is an example of a screen for monitoring/detecting an abnormality in a preform mold-releasing operation of the injection molding part 100 using the above-described operation abnormality detection device 600 or operation abnormality detection method. FIG. 6 shows an aspect in which a period of time (an example of the actual measured values) from a timing at which the injection neck mold, which is a split mold, is mold-opened until the preform 10 released from the injection neck mold is accommodated in the holding member 152 of the take-out device 150 is displayed as "falling speed", an average value of the period of time in a prescribed cycle (for example, 20 cycles) is displayed as "average falling speed", a standard deviation of the average value is displayed as "standard deviation", and the greater one of the first threshold value and the second threshold value is displayed as "threshold value of outlier". On the screen shown in FIG. 6, "Data is being acquired" and "Detecting" of "Status" are similar to the aspect shown in FIG. 5.

Figure 7:
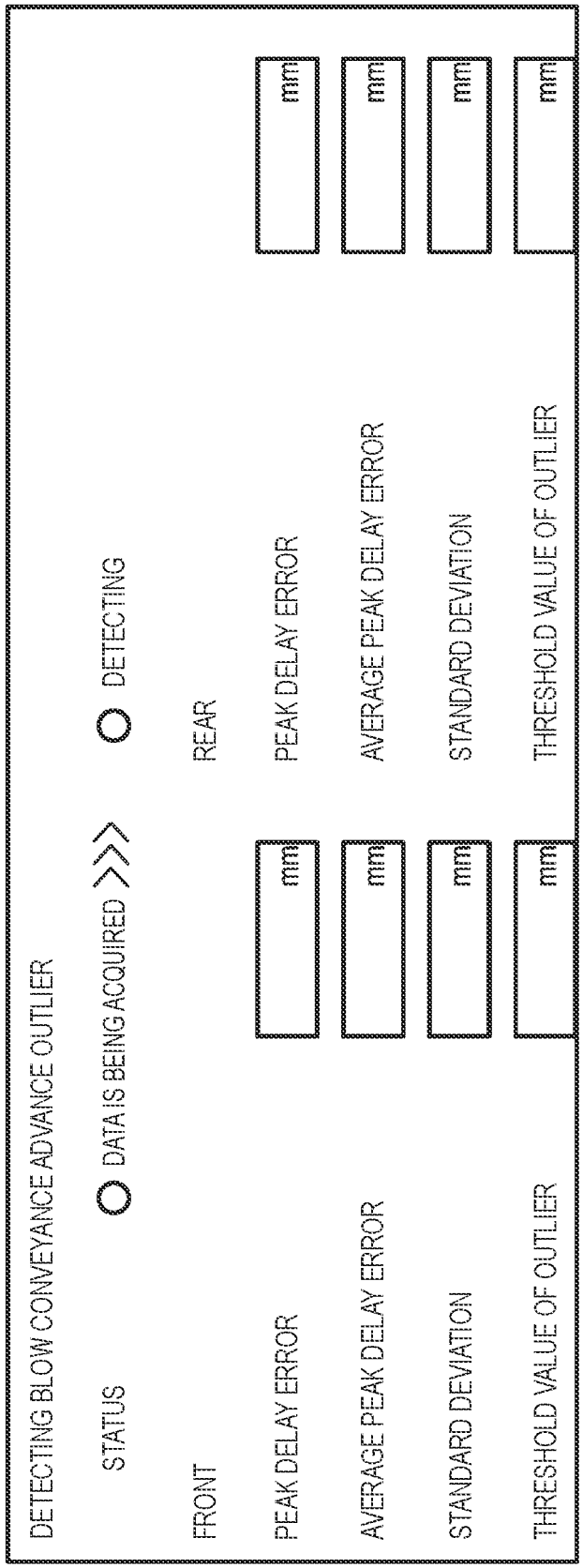
FIG. 7 shows an example of an aspect in which the display unit displays elements of an operating state of a second conveyance member.

FIG. 7 shows an example of an aspect in which the display unit 710 displays elements of an operating state of the second conveyance member 530 of the blow molding part 500 of the blow molding apparatus 1, and is an example of the screen for monitoring/detecting an abnormality in a conveyance operation for the preform 10 or the container 20 in the blow molding part 500 using the above-described operation abnormality detection device 600 or operation abnormality detection method. FIG. 7 shows an aspect in which below the word "front", a difference value between the movement value (an example of the actual measured value) of the front end (front) of the second conveyance member 530 and the first setting value is displayed as "peak delay error", an average value of the difference values in a prescribed cycle is displayed as "average peak delay error", a standard deviation of the average value is displayed as "standard deviation", and the greater one of the first threshold value and the second threshold value is displayed as "threshold value of outlier". In addition, FIG. 7 shows an aspect in which below the word "rear", a difference value between the movement value (an example of the actual measured values) of the rear end (rear) of the second conveyance member 530 and the first setting value is displayed as "peak delay error", an average value of the difference values in a prescribed cycle is displayed as "average peak delay error", a standard deviation of the average value is displayed as "standard deviation", and the greater one of the first threshold value and the second threshold value is displayed as "threshold value of outlier". On the screen shown in FIG. 7, "Data is being acquired" and "Detecting" of "Status" are similar to the aspect shown in FIG. 5.

Hereinafter, a manufacturing method of a resin container by the blow molding apparatus 1 including the operation abnormality detection device 600 according to the present embodiment will be described. A manufacturing method of a resin container includes a step of injection-molding a preform 10 in the injection molding part 100, a step of conveying the preform 10 molded in the injection molding part 100 to the blow molding part 500, a step of heating the preform 10 while conveying the preform 10 to the blow molding part 500, and a step of blow-molding the conveyed preform 10 into a container 20 in the blow molding part 500.

The step of injection-molding the preform 10 is a step of molding N preforms by injecting molten resin into a space formed by mold clamping the injection core mold 120, the injection neck mold, and the injection cavity mold 130 of the injection molding part 100 (FIG. 2).

The step of conveying the preform 10 molded in the injection molding part 100 to the blow molding part 500 includes a first conveyance step, a first transfer step, a second conveyance step, and a second transfer step. The first conveyance step is a step of taking out the preform 10 from the injection molding part 100 by the take-out device 150 and further transferring the preform from the take-out device 150 to the first reversing part 200 by the preform transfer device 220 (FIG. 2). The first transfer step is a step of reversing the preform 10 from the upright state to the inverted state by the first reversing part 200 and transferring the same to the conveyance part 300 (FIG. 2).

The second conveyance step is a step of conveying the preform 10 to the second reversing part 400 in the conveyance part 300 (FIG. 1). In the second conveyance step, the leading row of one set of the first conveyance members 310 of the parallel driving device 370 are conveyed leftward by the carry-out device, and the preforms 10 are conveyed to the second reversing part 400 via the continuous conveyance region T1 and the intermittent conveyance region T2 (FIGS. 1 and 2).

The second transfer step is a step of reversing the preform 10 from the inverted state to the upright state by the second reversing part 400 and transferring the same to the second conveyance member 530 of the blow molding part 500 (FIG. 2). However, when the temperature-raising of the heating device of the heating unit 360 has not been completed, the preform 10 is not transferred to the blow molding part 500, and the preform 10 is removed from the first conveyance member 310 in the sprocket 330c. The first conveyance member 310 on which the preform 10 is not placed is delivered to the parallel driving device 370 by the sprocket 330c (FIGS. 1 and 2).

The step of heating the preform 10 is a step of heating the preform 10 to an optimum temperature for blow molding during conveyance by the heating device of the heating unit 360 provided in the continuous conveyance region T1 of the conveyance part 300.

The step of blow-molding the preform 10 into the container 20 is a step of conveying the preform 10 from the preform receiving position B1 to the blow molding position B2 by the second conveyance member 530, mold-clamping the blow cavity mold and the bottom mold, and blowing the air into the preform 10 to mold the container 20. Through these steps, the container 20 is manufactured.

Figure 8:
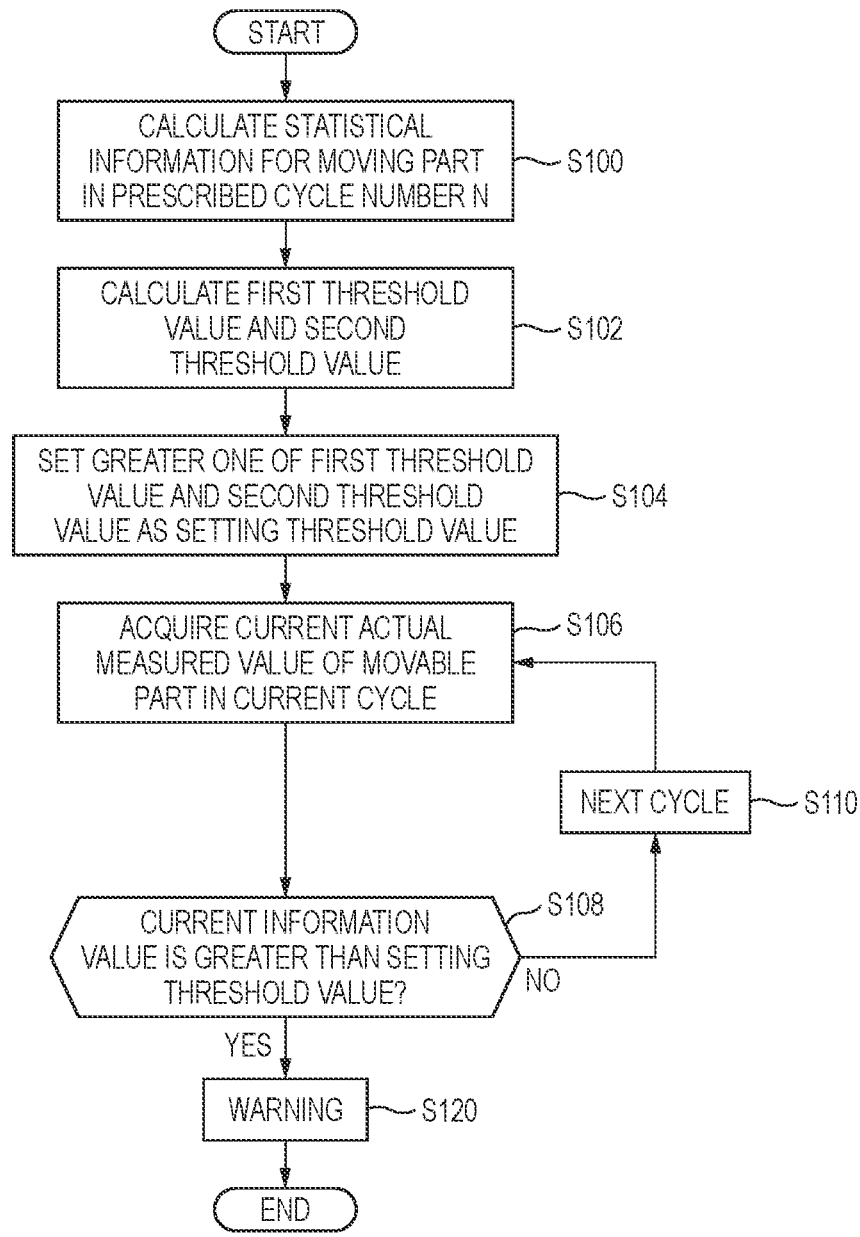
FIG. 8 shows an example of a flow of an operation abnormality detection method.

FIG. 8 shows an example of a flow of an operation abnormality detection method of the blow molding apparatus 1. The example of FIG. 8 shows an aspect of detecting an operation abnormality of the injection core mold 120, the injection neck mold, or the second conveyance member 530. In this example, the flow of detecting an operation abnormality of the second conveyance member 530 from a point of time when an operation of the blow molding apparatus 1 is started will be described. First, the acquisition unit 612 acquires the movement value (prescribed actual measured values) of the second conveyance member 530 measured by the sensor in a prescribed cycle number N, and the average value calculation unit 614 calculates difference values between the movement value acquired by the acquisition unit 612 and the first setting value for the second conveyance member 530, and calculates, as statistical information, an average value of the difference values (information values) in the prescribed cycle number N (step S100). Note that, in the case of implementation in the injection neck mold, the average value in the prescribed cycle number N may be calculated as statistical information, based on the actual measured values (information value) of the falling time of the preform in each cycle. In addition, in the case of implementation the injection core mold 120, the average value in the prescribed cycle number N may be calculated as statistical information, based on the actual measured values (information value) of the maximum pump pressure value of the hydraulic pump in each cycle.

Subsequently, the threshold value calculation unit 616 calculates the first threshold value and the second threshold value in accordance with the equations (1) and (2) (step S102). For the parameters required for calculation of each threshold value, parameters input in advance may be received by the reception unit 622 or parameters used during a past operation and stored in the storage 650 may be recalled. Subsequently, the first comparison unit 618 sets the greater one of the first threshold value and the second threshold value, as a setting threshold value (step S104).

Subsequently, the acquisition unit 612 acquires the movement value (current actual measured value) of the second conveyance member 530 in the current cycle (step S106). Subsequently, the first comparison unit 618 compares the current difference value (current information value) based on the current actual measured value calculated by the average value calculation unit 614 with the setting threshold value (step S108). As a result of the comparison in step S108, when the current difference value (current information value) is greater than the setting threshold value (step S108: YES), the warning unit 620 issues a warning (step S120). As a result of the comparison in step S108, when the current difference value (current information value) is not greater than the setting threshold value (step S108: NO), the processing returns to step S106 again (step S110), and the movement value of the second conveyance member 530 is acquired. Here, the average value is updated each time the movement value is measured, and the first threshold value and the second threshold value are also updated correspondingly. This flow is repeated until the operation of the blow molding apparatus 1 is stopped or the warning unit 620 issues a warning.

Figure 9:
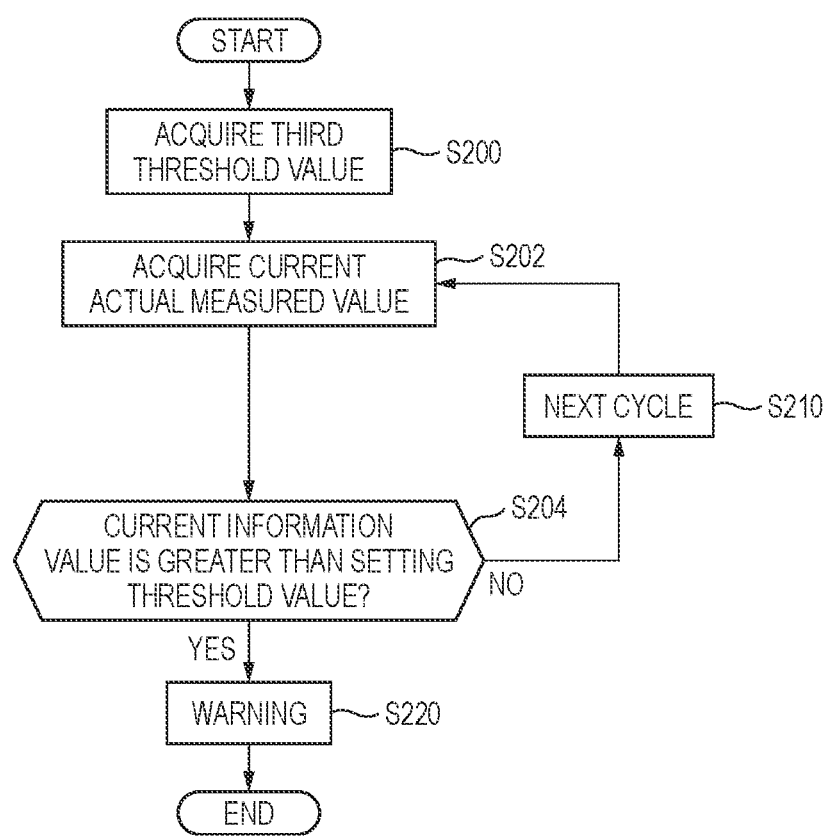
FIG. 9 shows another example of a flow of the operation abnormality detection method.

FIG. 9 shows another example of a flow of the operation abnormality detection method of the blow molding apparatus 1. The example of FIG. 9 shows an aspect of using the third threshold value when detecting an operation abnormality of the injection core mold 120, the injection neck mold, or the second conveyance member 530. Note that, the method shown in the flow of FIG. 9 is preferably implemented together with the method shown in the flow of FIG. 8. In this example, the flow of detecting an operation abnormality of the injection core mold 120 from a point of time when an operation of the blow molding apparatus 1 is started will be described. First, the acquisition unit 612 acquires a third threshold value obtained by multiplying an acceptable upper limit value of the pump pressure of the hydraulic pump relating to the opening/closing operation of the mold for injection molding by a prescribed ratio (for example, 90% or greater, as an example, 95%) (step S200). Next, the acquisition unit 612 acquires the maximum pump pressure value (current actual measured value (current information value)) of the hydraulic pump in an operation (mold opening operation) in which the injection core mold 120 is raised (step S202).

Subsequently, the second comparison unit 626 compares the current actual measured value (current information value) with the third threshold value (step S204). As a result of the comparison in step S204, when the maximum pump pressure value (current actual measured value (current information value)) is greater than the third threshold value (step S204: YES), the warning unit 620 issues a warning (step S220). As a result of the comparison in step S204, when the maximum pump pressure value (current actual measured value (current information value)) is not greater than the third threshold value (step S204: NO), the processing returns to step S202 again (step S210), and the maximum pump pressure value of the hydraulic pump of the injection core mold 120 is acquired. This flow is repeated until the operation of the blow molding apparatus 1 is stopped or the warning unit 620 issues a warning.

In the meantime, since the injection blow molding apparatus such as a 1.5-step type has many movable parts in the injection molding part and the blow molding part, a burden on a worker for setting a threshold value is great. Although the invention of an automatic calculation (generation) method of a threshold value is disclosed in the related art, the invention is insufficient in an injection blow molding apparatus with many moving parts. According to the method of the present disclosure, even in an injection blow molding apparatus with many movable parts, it is possible to appropriately implement an operation abnormality detection. In addition, since it is possible to implement the operation abnormality detection with the same logic for a plurality of movable parts, an input or output interface can be made with a similar configuration, the workload is small, and the operability and visibility can also be improved.

In addition, according to the above operation abnormality detection method, it is possible to automatically detect operation abnormalities of the movable parts of various molding apparatuses and to issue a warning for a worker, while reducing a workload imposed on the threshold value setting. Further, in the method of detecting an operation abnormality of the movable part of the molding apparatus based on the first threshold value based on the average value and the standard deviation thereof, when the unevenness of data is small, the standard deviation becomes small and the first threshold value becomes small, so that a value is detected as an outlier even when it slightly deviates from an average. In the operation abnormality detection method described above, in addition to the first threshold value, the second threshold value is also calculated, and when the second threshold value is greater than the first threshold value, the operation abnormality of the movable part of the molding apparatus is detected based on the second threshold value. The second threshold value based on the average value and the value obtained by multiplying the average value by a prescribed ratio (for example, 10%) can prevent a strict threshold value from being set when the unevenness of data is small. This makes it possible to easily set an appropriate threshold value for determining an operation abnormality, thereby reducing the workload.

Further, according to the operation abnormality detection method described above, the parameter m of the first threshold value may be input and received, and changed as necessary, and the first threshold value may be adjusted corresponding to the molding apparatus. Further, the threshold value used for comparison, the current information value, and the average value used for calculation of the threshold value are displayed, so that it is easy for a worker to determine validity of the threshold value.

Further, the operation abnormality detection method described above can be adopted in any of the mold opening operation of opening a mold for injection molding of the injection molding part, the mold-release operation of releasing a molded product from the mold for injection molding of the injection molding part, and the conveyance operation of conveying the preform or molded product in the blow molding part. Particularly, in a manufacturing apparatus in which an injection molding part and a blow molding part are integrated, it is possible to detect an operation abnormality in a plurality of operations with the same logic, which can improve workability. Further, when the method of input and display is unified, operability and visibility are also unified, and workability can further be improved. In addition, the operation abnormality detection method described above can also be employed in a manufacturing apparatus of a resin container having a blow molding part without an injection molding part, and in a manufacturing apparatus of a resin preform having an injection molding part without a blow molding part.

Further, when an information value (actual measured values or difference values) of the movable part, which is not measured in advance in a normal state, is recognized, a third threshold value (for example, second setting value×95%) corresponding to the information value may be set as the upper limit value of the threshold value for abnormality detection of the movable part. By setting the upper limit value of the threshold value, it is possible to implement detection and warning of an operation abnormality of the movable part without omission.

Further, when a resin container is manufactured by implementing the operation abnormality detection method described above, it is possible to detect an operation abnormality of the molding apparatus appropriately and automatically, thereby avoiding long-term machine stop and serious component damage.

Figure 10:
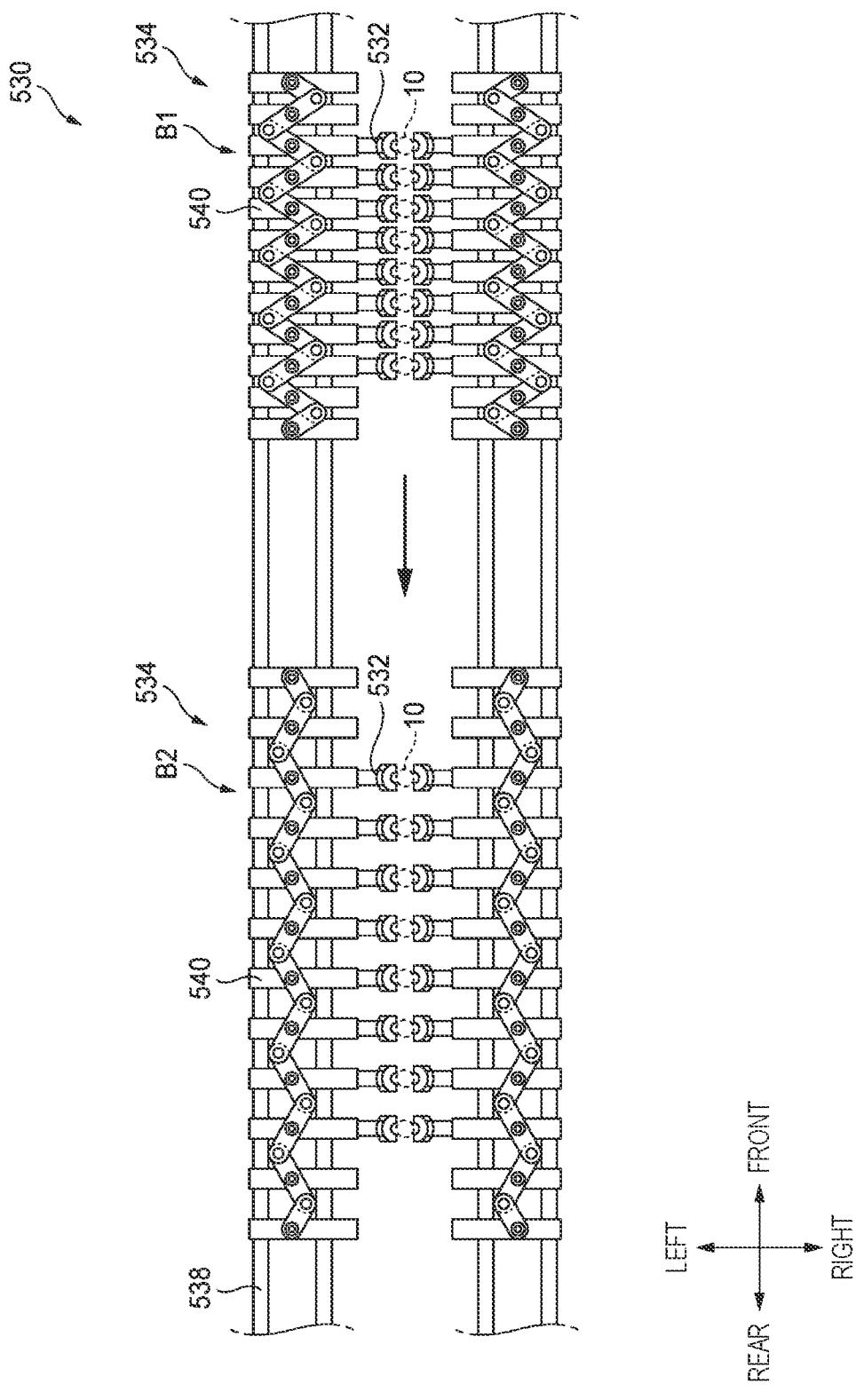
FIG. 10 shows a second conveyance member in a specific aspect.
Figure 11:
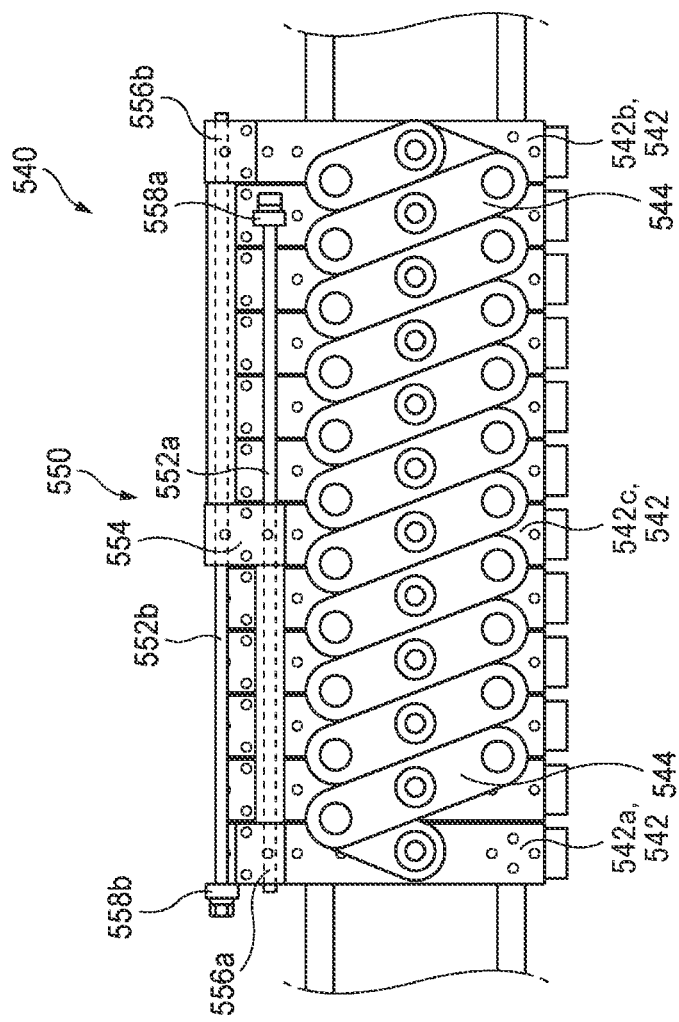
FIG. 11 shows a state in which a pitch changing mechanism provided for the second conveyance member narrows a pitch.
Figure 12:
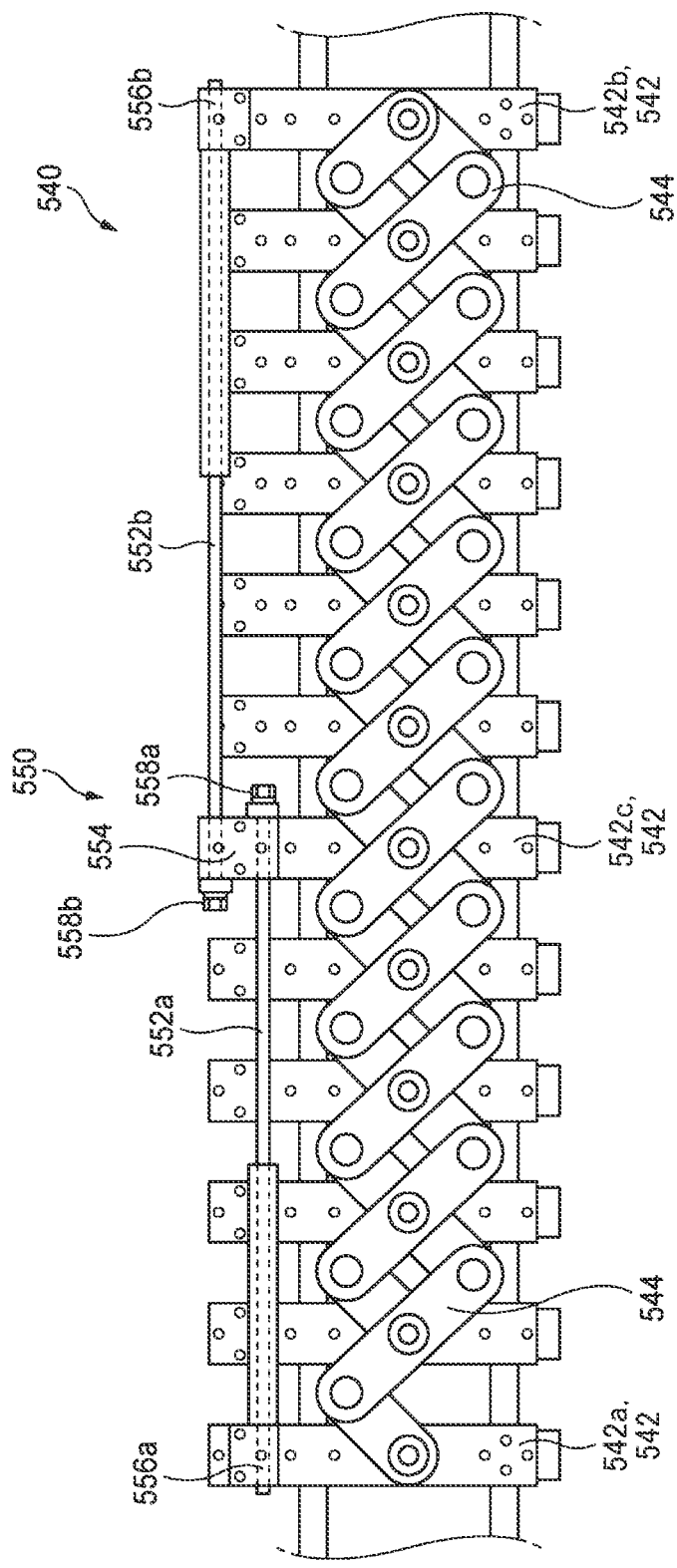
FIG. 12 shows a state in which the pitch changing mechanism provided for the second conveyance member widens a pitch.

Here, the second conveyance member 530 of the blow molding part 500 of the blow molding apparatus 1 according to a specific aspect will be described with reference to FIGS. 10, 11 and 12. FIG. 10 shows the second conveyance member 530 in a specific aspect. FIG. 11 shows a state in which a pitch changing mechanism provided for the second conveyance member 530 narrows a pitch. FIG. 12 shows a state in which the pitch changing mechanism provided for the second conveyance member 530 widens a pitch.

FIG. 10 shows an aspect in which the second conveyance member 530 of the carry-in unit 534 moves between the preform receiving position B1 and the blow molding position B2 along guide rails 538. The second conveyance member 530 includes holding arms 532 configured to hold the preforms 10 and pitch changing mechanisms 540 configured to change a pitch of the holding arms 532. The holding arm 532 and the pitch changing mechanism 540 are each provided one by one in the left and right direction, and are each configured to convey the preform 10 as a pair. An operation of changing a pitch by the pitch changing mechanism 540 is implemented by, for example, a servomotor. In this case, the servomotor may be arranged to change a pitch of either the left or right pitch changing mechanism 540, and the other pitch changing mechanism 540 may be configured to change the pitch with following the change in pitch of one pitch changing mechanism while holding the preform 10.

FIGS. 11 and 12 show specific aspects of the pitch changing mechanism 540. The pitch changing mechanism 540 has a plurality of attachment portions 542 to which a plurality of holding arms 532 are attached. The numbers of the holding arms 532 and the attachment portions 542 may be the same (for example, M=N/n: M is a natural number) as the number of preforms 10 to be conveyed to the blow molding part 500 in one cycle. A plurality of adjacent attachment portions 542 are connected by connecting members 544 each configured as a link mechanism, for example. The connecting member 544 is connected to the attachment portion 542 so as to be rotatable about one point of the attachment portion 542 as a shaft center, and the connecting members 544 adjacent to each other are connected to each other by inserting a bearing into through holes of the connecting members. One of the pair of pitch changing mechanisms 540 is configured so that a drive force of the servomotor is transmitted to each of a leading attachment portion 542a and a last attachment portion 542b.

Each of the pair of pitch changing mechanisms 540 includes a stopper mechanism 550. The stopper mechanism 550 is provided on an upper side of the attachment portions 542. The stopper mechanism 550 is preferably provided on an end side of the attachment portion 542 where the holding arm 532 is located. The stopper mechanism 550 includes at least a first guide bar 552a, a second guide bar 552b, and an insertion portion 554 through which the first guide bar 552a and the second guide bar 552b are inserted. The first guide bar 552a is fixed to the leading attachment portion 542a via a first fixing portion 556a. A first locking portion 558a is provided at an end portion of the first guide bar 552a on an opposite side to the first fixing portion 556a. The second guide bar 552b is fixed to the last attachment portion 542b via a second fixing portion 556b. A second locking portion 558b is provided at an end portion of the second guide bar 552b on an opposite side to the second fixing portion 556b. The insertion portion 554, the first fixing portion 556a, and the second fixing portion 556b are block-shaped members, and are fixed to the upper side of the attachment portions 542 in a convex shape. In FIGS. 11 and 12, the insertion portion 554 is provided on the sixth attachment portion 542c from the leading. The insertion portion 554 has insertion holes through which the first guide bar 552a and the second guide bar 552b are each inserted. An opening diameter of the insertion hole is such that the first locking portion 558a and the second locking portion 558b cannot pass through the insertion hole. The first guide bar 552a and the second guide bar 552b are each formed to have such a length that the first locking part 558a and the second locking part 558a come into contact with the insertion portion 554 at a point of time when the holding arms 532 of the carry-in unit 534 are widened to a prescribed pitch width at the blow molding position B2.

In a mechanism configured to change a pitch only by connection using a link mechanism of the related art, it is difficult to determine accurate positioning of the holding arms 532, and in some cases, a preform transfer failure has occurred. In addition, when a rack-and-pinion configuration is adopted for moving the other pitch changing mechanism in synchronization with an operation of one of the pair of pitch changing mechanisms, synchronization between the master and the slave is not always performed accurately, so that a large load may be applied to a pinion or a linear guide, and therefore, the second conveyance member 530 operating at high speed may be damaged. By adopting the pitch changing mechanism 540 having the specific stopper mechanism 550 described above, accurate positioning of the holding arms 532 can be realized and a stable operation becomes possible, so that a load to be applied to a component can be reduced.

Note that, the present invention is not limited to the above embodiment and can be freely modified and improved as appropriate. In addition, the material, shape, dimension, numerical value, form, number, arrangement location, and the like of each constitutional element in the above embodiment are arbitrary and are not particularly limited as long as the present invention can be achieved.

For example, in the embodiment described above, the aspect in which various functional units are implemented in the processor of one device has been described. However, various functional units may be distributed and implemented in processors of a plurality of devices via a local network or the Internet. In addition, in the embodiment described above, the display unit 710 and the input unit 720 have been described as separate aspects, but may be configured as one functional unit by a touch panel or the like with which an input and a display can be made.

The present application is based on the Japanese Patent Application (Patent Application No. 2020-123154) filed on Jul. 17, 2020, the entirety of which is incorporated by reference. Also, all references cited herein are incorporated in their entirety.

REFERENCE SIGNS LIST

1: blow molding apparatus, 10: preform, 20: container, 100: injection molding part, 200: first reversing part, 300: conveyance part, 310: first conveyance member, 360: heating unit, 400: second reversing part, 500: blow molding part, 600: operation abnormality detection device, 612: acquisition unit, 614: average value calculation unit, 616: threshold value calculation unit, 618: first comparison unit, 620: warning unit, 622: reception unit, 624: display command unit, 626: second comparison unit, 700: input/output device, 710: display unit, 720: input unit

The invention claimed is:

1. A manufacturing method of a resin container, comprising:
  injection molding a resin preform; and
  manufacturing a resin container by blow-molding a preform molded in the injection molding,
  wherein, in at least one of an injection molding apparatus that is used in the injection molding and a blow molding apparatus that is used in the blow molding, an operation abnormality detection method is implemented for detecting an operation abnormality of a molding apparatus comprising a movable part, the operation abnormality detection method comprising:
  acquiring prescribed actual measured values relating to an operation of the movable part in a recent prescribed cycle number and calculating, as statistical information, an average value of prescribed information values based on the prescribed actual measured values;
  calculating a first threshold value based on the average value and a standard deviation thereof and a second threshold value based on the average value and a value obtained by multiplying the average value by a prescribed ratio;
  acquiring a current actual measured value relating to an operation of the movable part in a current cycle, determining a greater one of the first threshold value and the second threshold value, and comparing a current information value based on the current actual measured value with the greater one of the first threshold value and the second threshold value, and issuing a warning when the current information value exceeds the greater one of the first threshold value and the second threshold value, wherein the first threshold value is represented by a following equation (1), the first threshold value=the average value of the prescribed information values+m×σ . . . (1)

in the equation, m represents a parameter of the first threshold value set in advance, and a represents a standard deviation of the average value, and wherein the second threshold value is represented by a following equation (2), the second threshold value=the average value of the prescribed information values+the average value×n/100 . . . (2)

in the equation, n represents a parameter (%) of the second threshold value set in advance.

2. The manufacturing method according to claim 1, wherein the current information value is the current actual measured value itself or a current difference value between the current actual measured value and a setting value for an operation of the movable part, and wherein the prescribed information values are the prescribed actual measured values themselves or prescribed difference values that are a plurality of difference values calculated by comparing a plurality of actual measured values in a prescribed cycle number and the setting value.

3. The manufacturing according to claim 1, comprising causing a display unit to display the greater one of the first threshold value or the second threshold value, the current information value in the current cycle, and the average value.

4. The manufacturing method according to claim 1, wherein the operation abnormality detection method is implemented in at least one of a mold opening operation of opening a mold for injection molding of an injection molding apparatus, a mold-release operation of releasing a molded product from a mold for injection molding of an injection molding apparatus, and a conveyance operation of conveying a preform or molded product in the blow molding apparatus.

5. The manufacturing method according to claim 1, comprising: comparing the current information value with a third threshold value corresponding to an information value based on an actual measured value of the movable part, which is not measured in a normal state, and issuing a warning when the current information value exceeds the third threshold value.

6. A manufacturing apparatus of a resin container, comprising:
an injection molding part configured to injection-mold a resin preform;
a blow molding part configured to manufacture a resin container by blow-molding the preform molded in the injection molding part; and
an operation abnormality detection device configured to detect an operation abnormality of a molding apparatus comprising a movable part, the operation abnormality detection device comprising a processor configured to:
acquire actual measured values detected by a sensor arranged in the molding apparatus and relating to an operation of the movable part;
calculate, as statistical information, an average value of prescribed information values based on prescribed actual measured values and relating to an operation of the movable part in a recent prescribed cycle number;
calculate a first threshold value based on the average value and a standard deviation thereof and a second threshold value based on the average value and a value obtained by multiplying the average value by a prescribed ratio;

determine a greater one of the first threshold value and the second threshold value and compare a current information value based on a current actual measured value and relating to an operation of the movable part in a current cycle with the greater one of the first threshold value and the second threshold value; and issue a warning when the current information value exceeds the greater one of the first threshold value and the second threshold value, wherein the first threshold value is represented by a following equation (1), the first threshold value=the average value of the prescribed information values+m×σ . . . (1), in the equation, m represents a parameter of the first threshold value set in advance, and a represents a standard deviation of the average value, and wherein the second threshold value is represented by a following equation (2), the second threshold value=the average value of the prescribed information values+the average value×n/100 . . . (2), in the equation, n represents a parameter (%) of the second threshold value set in advance, and wherein the operation abnormality detection device is configured to detect an operation abnormality of the movable part in at least one of the injection molding part and the blow molding part.

7. The manufacturing apparatus according to claim 6, wherein the current information value is the current actual measured value itself or a current difference value between the current actual measured value and a setting value for an operation of the movable part, and wherein the prescribed information values are the prescribed actual measured values themselves or prescribed difference values that are a plurality of difference values calculated by comparing a plurality of actual measured values in a prescribed cycle number and the setting value.

8. The manufacturing apparatus according to claim 6, wherein the processor is further configured to cause a display unit to display the greater one of the first threshold value and the second threshold value, the current information value in the current cycle, and the average value.

9. The manufacturing apparatus according to claim 6, wherein the movable part is a core mold for injection molding of an injection molding machine, or a conveyance member of a blow molding machine.

10. The manufacturing apparatus according to claim 6, wherein the processor is further configured to compare the current information value with a third threshold value corresponding to an information value based on an actual measured value of the movable part, which is not measured in a normal state, and issue a warning when the current information value exceeds the third threshold value.

11. The manufacturing apparatus of the resin container according to claim 6, further comprising a display configured to be able to display the greater one of the first threshold value and the second threshold value, the current information value in the current cycle, and the average value.

12. A manufacturing apparatus of a resin container comprising:
a blow molding part configured to manufacture a resin container by blow-molding a preform; and
the operation abnormality detection device according to claim 6.

13. A manufacturing apparatus of a resin preform, comprising:
an injection molding part configured to injection-mold a resin preform; and
the operation abnormality detection device according to claim 6.

* * * * *